US011066567B2

(12) United States Patent
Doumaux et al.

(10) Patent No.: US 11,066,567 B2
(45) Date of Patent: *Jul. 20, 2021

(54) THERMAL INKJET DYE SUBLIMATION INKS (71) Applicant: HEWLETT-PACKARD DEVELOPMENT COMPANY, L.P., Spring, TX (US)

(72) Inventors: Howard Doumaux, San Diego, CA (US); Nicholas J. Stewart, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/608,385

(22) PCT Filed: Nov. 8, 2017

(86) PCT No.: PCT/US2017/060683
§ 371 (c)(1),
(2) Date: Oct. 25, 2019

(87) PCT Pub. No.: WO2019/094006
PCT Pub. Date: May 16, 2019

(65) Prior Publication Data
US 2020/0369899 A1 Nov. 26, 2020

(51) Int. Cl.
C09D 11/328 (2014.01)
B41J 2/14 (2006.01)
(Continued)

(52) U.S. Cl.
CPC ............. C09D 11/328 (2013.01); B41J 2/01 (2013.01); B41J 2/14112 (2013.01);
(Continued)

(58) Field of Classification Search
CPC .... B41J 2/1433; B41J 2/1623; B41J 2202/00; B41J 2202/03; B41J 2/14201; B41J 2/045;
(Continued)

(56) References Cited

U.S. PATENT DOCUMENTS 7,479,178 B2   1/2009   Dodge et al.
8,360,569 B2   1/2013   Chen et al.
(Continued)

FOREIGN PATENT DOCUMENTS

CN   101245204 A   8/2008
WO   WO2017146741 A1   8/2017

Primary Examiner — Manish S Shah
(74) Attorney, Agent, or Firm — Dierker & Kavanaugh PC (57) ABSTRACT A thermal inkjet dye sublimation ink consists of a disperse dye colorant dispersion, primary and secondary solvents, a chelating agent, oleth-3-phosphate, additive(s), and water. The colorant dispersion is present in an amount ranging from about 1 wt % actives to about 7 wt % actives. The amount of the primary solvent (glycerol, ethoxylated glycerol, 2-methyl-1,3-propanediol, dipropylene glycol, or combinations thereof) ranges from about 10 wt % to about 22 wt %, and the amount of the secondary solvent ranges from 0 wt % to about 7 wt %. The chelating agent amount ranges from 0 wt % actives to less than 0.1 wt % actives, and the oleth-3-phosphate amount ranges from about 0.1 wt % to about 0.75 wt. The additive is selected from the group consisting of a buffer, a biocide, another surfactant, and combinations thereof.

15 Claims, 7 Drawing Sheets (51) Int. Cl.
*B41M 5/00* (2006.01)
*C09D 11/033* (2014.01)
*C09D 11/037* (2014.01)
*C09D 11/38* (2014.01)
*D06P 1/16* (2006.01)
*D06P 1/647* (2006.01)
*D06P 5/28* (2006.01)
*D06P 5/30* (2006.01)
*B41J 2/01* (2006.01)
*B41J 2/21* (2006.01)

(52) U.S. Cl.
CPC .......... *B41J 2/2107* (2013.01); *B41M 5/0023* (2013.01); *C09D 11/033* (2013.01); *C09D 11/037* (2013.01); *C09D 11/38* (2013.01); *D06P 1/16* (2013.01); *D06P 1/647* (2013.01); *D06P 5/006* (2013.01); *D06P 5/30* (2013.01)

(58) Field of Classification Search
CPC .. B41J 11/0015; B41J 11/002; B41J 2/04581; B41J 2/055; B41J 2/16538; B41J 2002/16502; B41J 3/4078; B41J 11/06; B41J 2/2117; B41J 2/2107; B41J 2/01; B41J 2/211; B41J 2/17; B41J 2/17593; B41J 2/1755; B41J 2/2114; B41J 2/2056; B41J 2/21; B41J 2/0057; B41J 3/60; B41J 2002/012; B41J 2/04598; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/54; C09D 11/30; C09D 11/102; C09D 11/107; C09D 11/322; C09D 11/36; C09D 11/40; C09D 11/38; C09D 11/32; C09D 11/324; C09D 11/328; C09D 11/101; C09D 11/005; C09D 11/52; C09D 11/106; D06P 1/0032; D06P 1/0096; D06P 5/001; D06P 5/02; D06P 5/2011; D06P 5/2077; D06P 5/2083; D06P 5/30; Y10T 428/24802
See application file for complete search history.

(56) References Cited

U.S. PATENT DOCUMENTS

| | | | |
|---|---|---|---|
| 8,795,422 B2 | 8/2014 | Ganapathiappan et al. | |
| 8,969,245 B2 | 3/2015 | Renz et al. | |
| 2003/0081028 A1* | 5/2003 | Feinn | B41J 2/04581 347/12 |
| 2013/0205517 A1* | 8/2013 | Oguchi | C09D 11/38 8/471 |
| 2016/0002847 A1 | 1/2016 | Glenat et al. | |
| 2016/0208435 A1* | 7/2016 | Oguchi | C09D 11/40 |

* cited by examiner

THERMAL INKJET DYE SUBLIMATION INKS

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers, and in particular piezoelectric inkjet printers, are gaining rapid acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Thermal inkjet printing involves electrically activating a resistor, which causes the resistor to heat rapidly and vaporize a thin film of the ink adjacent to the resistor, thereby ejecting a drop of ink from the printhead. The thermal interaction between the resistor and the ink can limit the type of ink that can be printed via thermal inkjet printheads. This type of thermal interaction is not involved in piezoelectric inkjet printing, and this may be one reason that dye sublimation inks have generally been formulated for piezoelectric printing. Furthermore, piezoelectric printheads are able to efficiently operate for long periods in the presence of high valence (e.g., $2^+$, $3^+$) metal salts and other organic impurities that may be present in the dye sublimation ink formulation.

Examples of the dye sublimation ink disclosed herein are particularly suitable for thermal inkjet printing, in part because they include oleth-3-phosphate (a jetting agent) or a specific combination of a chelating agent and oleth-3-phosphate. It has unexpectedly been found that oleth-3-phosphate or the combination of the chelating agent and the oleth-3-phosphate at very low levels (in total, less than 1 wt % of the inks) are able to counteract high valence ($2^+$, $3^+$) metal salts and other organic impurities introduced from the disperse dye colorant dispersion. The high valance (e.g., $2^+$, $3^+$) metal salts (e.g., iron, calcium, aluminum) are present in the inks disclosed herein at levels ranging from about 4 ppm to about 10 ppm, which are well above typical thermal inkjet inks. However, it has been found that oleth-3-phosphate or the combination of the chelating agent and the oleth-3-phosphate at the low levels disclosed herein aid in making the dye sublimation ink jettable via thermal inkjet printheads and also provide substantially consistent print quality (i.e., ≤25% change in drop velocity and/or change in drop weight, and in some instances ≤15% change in drop velocity and/or drop weight) over the life of the printhead (e.g., from over 100 million drops per nozzle to 1 billion drops per nozzle). It has been found that the inks disclosed herein can extend the printhead life by two to three orders of magnitude when compared to inks that do not include the oleth-3-phosphate or the specific combination of a chelating agent and the oleth-3-phosphate. This means that better print quality, e.g., prints without banding, missing spaces, and/or misdirected drops, can be achieved for a longer period of time using the inks disclosed herein.

In addition to having improved jettability from a thermal inkjet printhead, it is believed that the dye sublimation ink disclosed herein is particularly suitable for directly forming an image on a textile substrate, such as polyester. The solvent levels used in the inks disclosed herein are relatively low (e.g., 22 wt % or less, and in some instances 16 wt % or less), which is believed to improve the storage ability of the prints formed via the direct printing method disclosed herein. After being printed, sublimed, and re-solidified, some disperse dyes can migrate across the textile substrate or within the fibers of the textile substrate when exposed to high temperature storage conditions (e.g., 38° C.). It is believed that the reduced amount of the solvents in the inks disclosed herein can contribute to a reduced amount of residual solvent in the printed image, which improves dye re-solidification and reduces dye migration during storage.

An example of the thermal inkjet dye sublimation ink disclosed herein consists of a disperse dye colorant dispersion present in an amount ranging from about 1 wt % actives to about 7 wt % actives based on a total weight of the ink; a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink; a secondary solvent present in an amount ranging from 0 wt % to about 7 wt % based on the total weight of the ink; a chelating agent present in an amount ranging from 0 wt % actives to less than 0.1 wt % actives based on the total weight of the ink; oleth-3-phosphate present in an amount ranging from about 0.1 wt % to about 0.75 wt % based on the total weight of the ink; an additive selected from the group consisting of a buffer, a biocide, another surfactant, and combinations thereof; and a balance of water. In these examples, the thermal inkjet dye sublimation ink consists of the listed components and no additional components (such as shear thinning agents, additional solvents, etc.). In other examples, the thermal inkjet dye sublimation ink comprises the listed components, and other components that do not deleteriously affect the jettability of the ink via a thermal inkjet printhead may be added.

Throughout this disclosure, a weight percentage that is referred to as "wt % actives" refers to the loading of an active component of a dispersion or other formulation that is present in the thermal inkjet dye sublimation ink. For example, the wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink. The term "wt %," without the term actives, refers to the loading of a 100% active component that does not include other non-active components therein.

In the examples disclosed herein, the disperse dye colorant dispersion may be any color. In an example, the disperse dye colorant dispersion is selected from the group consisting of a black disperse dye colorant dispersion, a magenta disperse dye colorant dispersion, and a yellow disperse dye colorant dispersion. Each disperse dye colorant dispersion includes a disperse dye, a dispersant, and a dispersion vehicle.

The disperse dye included in the colorant dispersion may depend on the desired color for the thermal inkjet dye sublimation ink.

Black disperse dye colorant dispersions often include a blend of disperse dyes, such as, for example, blends of blue, brown and yellow disperse dyes, or blends of blue, orange and violet disperse dyes, or blends of blue, orange and yellow disperse dyes, or blue, magenta, and yellow dyes. An example of a suitable blue, brown and yellow disperse dye blend include disperse blue 360 (DB360), disperse brown 27, and disperse yellow 54 (DY54). Some examples of suitable blue, orange and violet disperse dye blends include disperse blue 291:1 (DB291:1), disperse orange 29 (DO29) and disperse violet 63, or DB291:1, DO29 and disperse violet 99. An example of a suitable blue, orange and yellow dye blend includes DB360, disperse orange 25, and DY54. An example of a suitable blue, magenta, and yellow dye blend includes disperse blue 77 (DB77), disperse red 92, and disperse yellow 114 (DY 114).

Magenta disperse dye colorant dispersions may include red disperse dyes, such as disperse red 60, disperse red 82, disperse red 86, disperse red 86:1, disperse red 167:1, disperse red 279, and mixtures thereof.

Yellow disperse dye colorant dispersions may include yellow disperse dyes, such as DY54, disperse yellow 64, disperse yellow 71, disperse yellow 86, DY114, disperse yellow 153, disperse yellow 233, disperse yellow 245, and mixtures thereof.

The disperse dye colorant dispersion may include from about 10 wt % dye solids to about 20 wt % dye solids based on the total weight of the colorant dispersion.

As mentioned above, each disperse dye colorant dispersion also includes a dispersant. The dispersant may be any suitable polymeric dispersant that can disperse the dye and that can be jetted via a thermal inkjet printhead.

Some examples of the polymeric dispersant (which may also be anionic or non-ionic) include polymers or copolymers of acrylics, methacrylics, acrylates, methacrylates, styrene, substituted styrene, α-methylstyrene, substituted α-methyl styrenes, vinyl naphthalenes, vinyl pyrollidones, maleic anhydride, vinyl ethers, vinyl alcohols, vinyl alkyls, vinyl esters, vinyl ester/ethylene copolymers, acrylam ides, and/or methacrylamides. Some specific examples include a styrene methacrylic acid copolymer, a styrene acrylic acid copolymer, styrene acrylic acid-acrylic ester copolymers, styrene methacrylic acid-acrylic ester copolymers, a styrene maleic anhydride copolymer, polyacrylic acid partial alkyl ester, polyalkylene polyamine, polyacrylates, and vinyl naphthalene-maleic acid copolymers. Another example of a suitable polymeric dispersant is a polyurethane polymer. Still other examples of suitable polymeric dispersants for the disperse dye colorant dispersion include block acrylic copolymers, including A-B block copolymers such as benzyl methacrylate-methacrylic acid diblock copolymers and butyl methacrylate-methacrylic acid diblock copolymers. Still further examples of suitable polymeric dispersants include ABC triblock copolymers, such as benzyl methacrylate-methacrylic acid-ethoxytriethyleneglycol methacrylate triblock copolymers and butyl methacrylate-methacrylic acid-ethoxytriethyleneglycol methacrylate triblock copolymers. Still some other examples of suitable dispersants include low acid value acrylic resins, such as JONCRYL® 586, 671, 675, 678, 680, 683, 690, 693, and 695 (from BASF Corp.).

Examples of polymerization methods used to form the dispersant may include free radical processes, Group Transfer Processes (GTP), radical addition fragmentation (RAFT), atom transfer reaction (ATR), special chain transfer polymerization technology (SCT), and the like. As one example, the dispersant may be a graft acrylic copolymer made by SCT.

In other examples, the disperse dyes may be self-dispersing dyes. The disperse dyes may be exposed to a diazonium treatment (where a charged free radical from a degraded azo attaches to the colorant), or to an ozone treatment (oxidation and functionalization with, e.g., a carboxylic acid), or to a crosslinking treatment to render the dye self-dispersing.

The disperse dye colorant dispersion may include from about 4 wt % dispersant solids to about 7 wt % dispersant solids, based on the total weight of the colorant dispersion.

The mean particle size of the solids (e.g., the disperse dyes and the dispersants) in the disperse dye colorant dispersion may range from about 50 nm to about 200 nm. In another example, the mean particle size of the disperse dye ranges from about 100 nm to about 200 nm. These particle sizes are particularly suitable for being jetted through the orifices of thermal inkjet printheads.

The dispersion vehicle may include water and a water soluble or water miscible co-solvent. Examples of the water soluble or water miscible co-solvent in the disperse dye colorant dispersion may include alcohols (e.g., diols, such as 1,2-propanediol, 1,3-propanediol, etc.), ketones, ketoalcohols, ethers (e.g., the cyclic ether tetrahydrofuran (THF), and others, such as thiodiglycol, sulfolane, 2-pyrrolidone, 1-(2-hydroxyethyl-2-pyrrolidone, 1,3-dimethyl-2-imidazolidinone and caprolactam; glycols such as ethylene glycol, diethylene glycol, tritriethylene glycol, tetraethylene glycol, propylene glycol, dipropylene glycol, tripropylene glycol, trimethylene glycol, butylene glycol, and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, and diethylene glycol monoethyl ether; and lower dialkyl ethers of polyhydric alcohols, such as diethylene glycol dimethyl or diethyl ether.

One or more of these co-solvents may be present in the disperse dye colorant dispersion in respective amounts ranging from about 1 wt % to about 5 wt %, based on the total weight of the colorant dispersion. The balance of the disperse dye colorant dispersion is water, such as purified water or deionized water.

In an example, the disperse dye colorant dispersion has i) a mean particle size ranging from about 50 nm to about 200 nm, and ii) from about 10 wt % dye solids to about 20 wt % dye solids and from about 4 wt % to about 7 wt % dispersant solids, based on the total weight of the colorant dispersion. In this example, the remainder of the disperse dye colorant dispersion may be co-solvent(s) and water.

As mentioned above, the oleth-3-phosphate or the specific combination of the chelating agent and the oleth-3-phosphate provides a synergistic effect within the ink that aid in making the dye sublimation ink jettable via thermal inkjet printheads and also results in substantially consistent print quality over the life of the thermal inkjet printhead. For yellow inks, these effects may be obtained with the oleth-3-phosphate alone, or with the combination of the chelating agent and the oleth-3-phosphate. For magenta and black inks, these effects may be obtained with the combination of the chelating agent and the oleth-3-phosphate. As such, disclosed herein is a method for improving thermal inkjet printing performance of a dye sublimation ink, comprising: selecting oleth-3-phosphate or a combination of a chelating agent and oleth-3-phosphate; and incorporating the combination into the dye sublimation ink, including a disperse dye colorant dispersion present in an amount ranging from about 1 wt % actives to about 7 wt % actives based on a total weight of the ink; a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink; a secondary solvent present in an amount ranging from 0 wt % to about 7 wt % based on the total weight of the ink; an additive selected from the group consisting of a buffer, a biocide, an other surfactant, and combinations thereof; and a balance of water; wherein the incorporating involves adding the chelating agent in an amount ranging from 0 wt % actives to less than 0.1 wt % actives based on the total weight of the ink; and adding the oleth-3-phosphate in an amount ranging from about 0.1 wt % to about 0.75 wt % based on the total weight of the ink.

To form the thermal inkjet dye sublimation ink disclosed herein, the disperse dye colorant dispersion is incorporated into an ink vehicle, which includes the primary solvent, the secondary solvent, the oleth-3-phosphate or the specific combination of the chelating agent and the oleth-3-phosphate, additive(s), and water.

The disperse dye colorant dispersion may be incorporated into the ink vehicle such that from about 1 wt % actives to about 7 wt % actives are present, based on a total weight of the thermal inkjet dye sublimation ink. In another example, the disperse dye colorant dispersion may be present in an amount ranging from about 3 wt % actives to about 5 wt % actives based on the total weight of the thermal inkjet dye sublimation ink. The wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink.

The primary solvent is selected, in part, because the disperse dye is highly non-soluble in the primary solvent. The primary solvent is also selected, in part, because it also helps to maintain the nozzle health of the thermal inkjet printheads, and to provide substantially consistent print quality over the life of the printhead. In an example, the primary solvent is selected from the group consisting of glycerol, ethoxylated glycerol, 2-methyl-1,3-propanediol, dipropylene glycol, and combinations thereof. The primary solvent is present in an amount ranging from about 10 wt % to about 22 wt % based on the total weight of the ink. It is to be understood that whether a single primary solvent is used or a combination of the primary solvents is used, the total amount of primary solvents is within the given range. In one example, the primary solvent includes a combination of glycerol and ethoxylated glycerol. In this example, the glycerol is present in an amount ranging from about 12 wt % to about 16 wt % based on the total weight of the ink, and the ethoxylated glycerol is present in an amount ranging from greater than 0 wt % to about 5 wt % based on the total weight of the ink.

The ink also includes the secondary solvent present in an amount ranging from 0 wt % to about 7 wt % based on the total weight of the ink. In an example, the disperse dye in the disperse dye colorant dispersion is more soluble in the secondary solvent than in the primary solvent, and thus makes up less than 50% of the total solvent content (i.e., primary solvent plus secondary solvent, and not including water) so that the disperse dyes remain dispersed in the ink vehicle. The secondary solvent may be added to the ink vehicle or may be included as part of the disperse dye colorant dispersion. The co-solvent(s) is present in the disperse dye colorant dispersion in relatively low amounts (1 wt % to about 5 wt % based on the total weight of the colorant dispersion), and thus a fraction of the co-solvent(s) is carried over to the ink disclosed herein depending, in part, upon the dispersion solids and the loading of the dispersion in the ink.

The chelating agent is present in an amount ranging from 0 wt % actives to less than 0.1 wt % actives based on the total weight of the ink. In an example, the chelating agent is present in an amount ranging from about 0.04 wt % actives to about 0.08 wt % actives based on the total weight of the ink. The wt % actives of the chelating agent accounts for the loading (as a weight percent) of the active chelator/chelating agent present in the ink, and does not account for the weight of other components of the chelating agent solution (e.g., water) in the inkjet ink. For yellow inks, the chelating agent may be present in an amount ranging from 0 wt % actives to less than 0.1 wt % actives based on the total weight of the ink. For black and magenta inks, the chelating agent may be present in an amount greater than 0 wt % actives to less than 0.1 wt % actives based on the total weight of the ink.

In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt ($Na_3MGDA$) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

The oleth-3-phosphate is present in an amount ranging from about 0.1 wt % to about 0.75 wt % based on the total weight of the ink. In an example, the oleth-3-phosphate is present in an amount ranging from about 0.2 wt % to about 0.5 wt % based on the total weight of the ink. Oleth-3-phosphate is commercially available as CRODAFOS™ O3A or CRODAFOS™ N-3 acid from Croda. It is believed that, in some examples, the oleth-3-phosphate aids the chelating agent in effectively trapping high levels of the metal ions present in the ink, and that the chelating agent keeps the oleth-3-phosphate from precipitating out of the ink. This combination leads to a significant and unexpected reduction in kogation in the thermal inkjet printhead. Kogation refers to the deposit of dried ink on a heating element of a thermal inkjet printhead, and the combination of the oleth-3-phosphate with the chelating agent assists in preventing the buildup of kogation and extending the life of the printhead. These synergistic effects were unexpected given the small amount of the two components and the relatively high level of metal ions present. In some examples of the ink disclosed herein (e.g., in yellow inks), these synergistic effects may be obtained by including the oleth-3-phosphate without the chelating agent.

The thermal inkjet dye sublimation ink disclosed herein also includes an additive selected from the group consisting of a buffer, a biocide, another surfactant (in addition to the oleth-3-phosphate), and combinations thereof.

In an example, the pH of the thermal inkjet dye sublimation ink ranges from about 7 to about 9.5 at the time of manufacture. In another example, the pH of the thermal inkjet dye sublimation ink ranges from about 8 to about 9 at the time of manufacture. pH adjuster(s), such as a buffer, may be added to the ink to counteract any slight pH drop that may occur over time. The pH may drop from about 0.5 units to about 1 unit over time after being manufactured. As such, the pH of the inks disclosed herein may be lower than the ranges set forth herein, depending, in part, upon how much time has passed since manufacture. In an example, the total amount of buffer(s) in the ink ranges from 0 wt % to about 0.5 wt % (with respect to the weight of the thermal inkjet dye sublimation ink). In another example, the total amount of buffer(s) in the ink is about 0.1 wt % (with respect to the weight of the thermal inkjet dye sublimation ink). Examples of some suitable buffers include TRIS (tris(hydroxymethyl) aminomethane or Trizma), bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl)methyl-4-aminobutanesulfonic acid), or the like.

In an example, the total amount of biocide(s) in the thermal inkjet dye sublimation ink ranges from about 0 wt % actives to about 0.5 wt % actives (with respect to the weight of the thermal inkjet dye sublimation ink). In another example, the total amount of biocide(s) in the inkjet ink composition is about 0.001 wt % actives to about 0.1 wt % actives (with respect to the weight of the thermal inkjet dye sublimation ink). The wt % actives of the biocide accounts for the loading (as a weight percent) of the active biocidal agent present in the ink, and does not account for the weight of other components of the biocide (e.g., water) in the inkjet ink.

Examples of suitable biocides include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.) and combinations thereof.

In an example, the total amount of surfactant(s) (in addition to the oleth-3-phosphate) in the thermal inkjet dye sublimation ink ranges from about 0 wt % to about 2 wt % (with respect to the weight of the thermal inkjet dye sublimation ink). In another example, the surfactant is present in an amount of 1 wt % or less. This other surfactant may be included in the thermal inkjet dye sublimation ink to control the viscosity, to improve the lubricity, and to prevent agglomeration of the dispersed dye solids. Examples of suitable surfactants include non-ionic, low foaming surfactants, such as ethoxylated 2,4,7,9-tetramethyl 5 decyn-4,7-diol (commercially available as SURFYNOL® 465 (HLB 13) from Evonik Industries) and other ethoxylated surfactants (commercially available as SURFYNOL® 440 (HLB 8) from Evonik Industries), or secondary alcohol ethoxylates (commercially available as TERGITOL® 15-S-7 (HLB 12.1), TERGITOL® 15-S-9 (HLB 12.6), etc. from The Dow Chemical Co.). In some examples, it has been found that the combination of SURFYNOL® 465 and SURFYNOL® 440 may contribute to the synergistic effects of the inks disclosed herein in terms of wetting.

It is to be understood that water is not considered a solvent or co-solvent in the inks disclosed herein, but rather is present in addition to the primary and secondary co-solvent(s) and makes up a balance of the ink. As such, the weight percentage of the water present in the thermal inkjet dye sublimation inks will depend, in part, upon the weight percentages of the other components. The water may be purified or deionized water.

Figure 1:
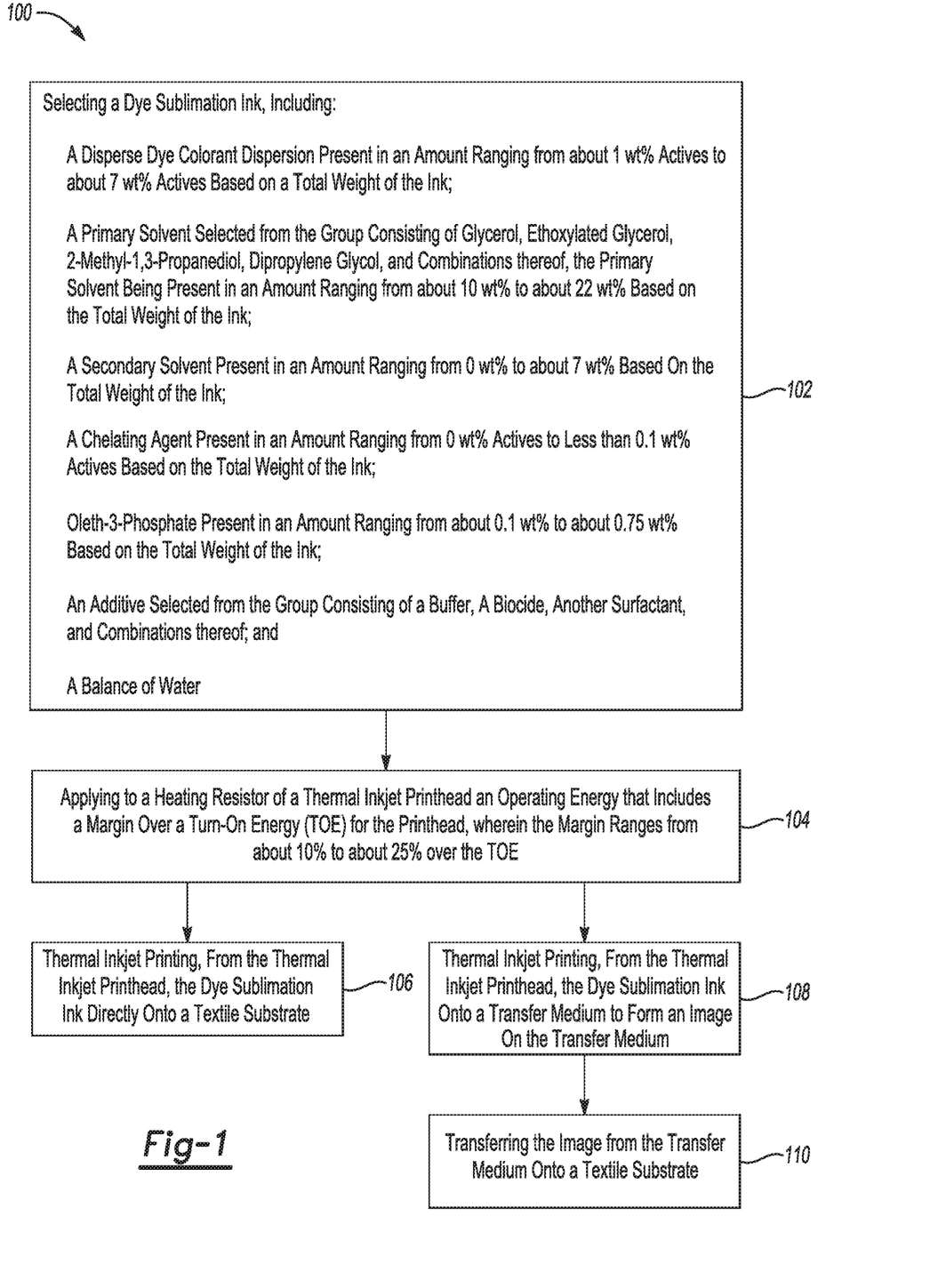
FIG. 1 is a flow diagram illustrating two examples of a printing method.

Referring now to FIG. 1, examples of the dye sublimation ink disclosed herein may be dispensed from a thermal inkjet printhead during examples of the printing method 100. One example of the method 100 (for direct printing) is shown at reference numerals 102, 104 and 106. Another example of the method 100 (for transfer printing) is shown at reference numerals 102, 104, 108, and 110.

The one example of the method 100 shown at reference numerals 102 and 104 includes selecting a dye sublimation ink, including: a disperse dye colorant dispersion present in an amount ranging from about 1 wt % actives to about 7 wt % actives based on a total weight of the ink; a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink; a secondary solvent present in an amount ranging from 0 wt % to about 7 wt % based on the total weight of the ink; a chelating agent present in an amount ranging from 0 wt % actives to less than 0.1 wt % actives based on the total weight of the ink; oleth-3-phosphate present in an amount ranging from about 0.1 wt % to about 0.75 wt % based on the total weight of the ink; an additive selected from the group consisting of a buffer, a biocide, an other surfactant, and combinations thereof; and a balance of water (as shown at reference numeral 102); applying to a heating resistor of a thermal inkjet printhead an operating energy that includes a margin over a turn-on energy (TOE) for the printhead, wherein the margin ranges from about 10% to about 25% over the TOE (as shown at reference numeral 104); and thermal inkjet printing, from the thermal inkjet printhead, the dye sublimation ink directly onto a textile substrate (as shown at reference numeral 106). Any examples of the ink disclosed herein may be used in this example of the method 100, and in one example, the disperse dye in the disperse dye colorant dispersion is more soluble in the secondary solvent than in the primary solvent.

The textile substrate may be polyester fabric, a polyester coated surface, blends of polyester and other materials (e.g., cotton, linen, etc.) as long as polyester is present in an amount of at least 50 wt % and is present at or near the surface of the fabric, nylons, or other fabrics. In one example, the polyester blend includes from about 70 wt % to about 80 wt % of the polyester. Examples of materials that may be coated with polyester include glass, metal, wood, plastics, ceramics, etc.

With direct printing onto the textile, the dye sublimation ink is thermally inkjetted onto the surface of the textile substrate (reference numeral 106). A thermal inkjet printhead uses a certain minimum energy to fire ink drops of the proper volume (herein called the turn-on energy). To accommodate various manufacturing tolerances, it may be desirable to deliver more energy to the average printhead than is required to fire it (called "over-energy") in order to allow for any uncertainty. However, it has been found that the inks disclosed herein can be printed at an operating energy that includes a margin over the turn-on energy (TOE) for the printhead, wherein the margin ranges from about 10% to about 25% over the TOE. In an example, the margin is about 15% over the TOE. The low over-energy printing may also contribute to the improved performance of the inks disclosed herein.

Once the dye sublimation ink disclosed herein is thermal inkjet printed directly on the textile, the textile may be exposed to heat, or heat and pressure. The heat, or heat and pressure is sufficient to sublimate the disperse dye so that it converts to a gas and penetrates into the textile. The heat, or heat and pressure may also be sufficient to open up the fibers of the textile substrate and allow the dye to migrate into the fibers. The dye then re-solidifies on the fibers of the textile substrate, which renders the printed image durable, wash-resistant, and colorfast. The heat to initiate sublimation may range from about 182° C. to about 215° C., and the pressure may range from 0 psi to about 100 psi.

The other example of the method 100 shown at reference numerals 102, 104, 108 and 110 includes selecting a dye sublimation ink, including: a disperse dye colorant dispersion present in an amount ranging from about 1 wt % actives to about 7 wt % actives based on a total weight of the ink; a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink; a secondary solvent present in an amount ranging from 0 wt % to about 7 wt % based on the total weight of the ink; a chelating agent present in an amount ranging from 0 wt % actives to less than 0.1 wt % actives based on the total weight of the ink; oleth-3-phosphate present in an amount ranging from about 0.1 wt % to about 0.75 wt % based on the total weight of the ink; an additive selected from the group consisting of a buffer, a biocide, an other surfactant, and combinations thereof; and a balance of water (as shown at reference numeral 102); applying to a heating resistor of a thermal inkjet printhead an operating energy that includes a margin over a turn-on energy (TOE) for the printhead, wherein the margin ranges from about 10% to about 25% over the TOE (as shown at reference numeral 104); thermal inkjet printing, from the thermal inkjet printhead, the dye sublimation ink onto a transfer medium to form an image on the transfer medium (as shown at reference numeral 108); and transferring the image from the transfer medium onto a textile substrate (as shown at reference numeral 110).

Any examples of the ink disclosed herein may be used in this example of the method 100, and in one example, the disperse dye in the disperse dye colorant dispersion is more soluble in the secondary solvent than in the primary solvent.

With transfer printing onto the textile substrate, the dye sublimation ink is thermally inkjetted onto the surface of a transfer medium (reference numeral 108). The desired final image may be printed as a mirror image or in reverse on the transfer medium. The transfer medium may be any substrate that will accept the ink and also facilitate the release of the ink. The transfer medium may be a coated paper (from 30 gsm to 150 gsm).

For printing on the transfer medium, the thermal inkjet printhead may be operated at the operating energy that includes a margin over the turn-on energy (TOE) for the printhead, wherein the margin ranges from about 10% to about 25% over the TOE.

The image on the transfer medium is then transferred to the desired textile substrate (reference numeral 110). To make the transfer, the printed on transfer medium is placed into contact with the textile substrate, and the two are exposed to heat, or heat and pressure to effect the sublimation. The transfer process may involve a heat press or a calender. In the heat press or calender, the printed transfer medium is brought into contact with the textile substrate that is to be imaged. The heat to initiate sublimation may range from about 182° C. to about 215° C., and the pressure may range from 0 psi to about 100 psi. The sublimated dye is converted to a gas and is able to penetrate into the textile substrate it is in contact with. The dye then re-solidifies on the fibers of the textile substrate, which renders the printed image durable, wash-resistant, and colorfast. The heat to initiate sublimation may range from about 182° C. to about 215° C., and the pressure may range from 0 psi to about 100 psi.

The dye sublimation inks disclosed herein are jettable via thermal inkjet printheads and cartridges.

Figure 2:
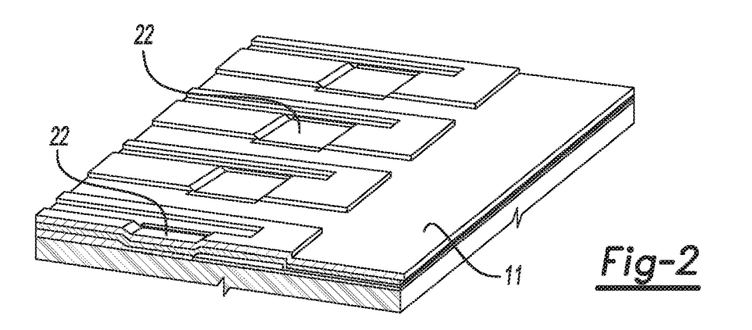
FIG. 2 is a partially cross-sectioned perspective semi-schematic illustration showing an example of heating resistors of an example thermal inkjet printhead.
Figure 3:
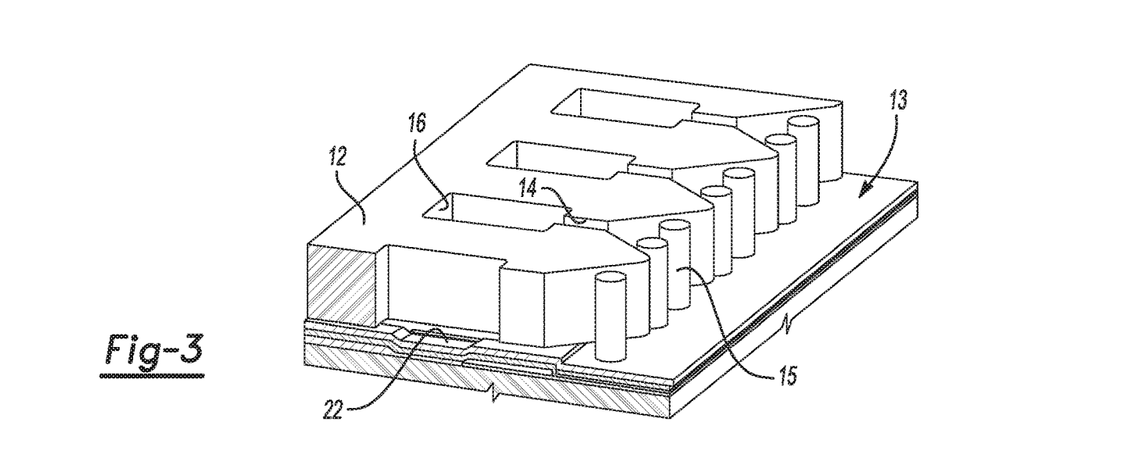
FIG. 3 is a partially cross-sectioned perspective semi-schematic illustration showing an example of ink chambers of an example thermal inkjet printhead.

Referring now to FIGS. 2-5 together, an example thermal inkjet printhead 10 generally includes a base substrate 11 (made, e.g., from silicon or another suitable material). The base substrate 11 may include multiple layers (as shown in FIG. 2) to operatively accommodate suitable electronics to fire printhead nozzles. The printhead 10 further includes a substrate 12 (made, e.g., from a polymeric or other suitable material) defined on the base substrate 11. The substrate 12 has at least one ink feed opening 14 and at least one ink chamber/reservoir 16 defined therein. Four ink feed openings 14 are shown in FIG. 3, though it is to be understood that any desirable number of ink feed openings 14 may be provided. The ink feed opening 14 is in operative and fluid communication with an ink chamber 16 and with an ink channel 13. In an example, one or more pillars 15 may be positioned between the ink channel 13 and the ink feed opening 14 to filter the ink supply before it enters the ink chamber 16.

The ink chamber 16 is generally configured to repeatedly receive ink, via ink feed opening 14 and ink channel 13, from an ink supply or source during inkjet printing. In one example, the printhead 10 may be incorporated with an ink cartridge 26 (see FIG. 5), and the ink chamber 16 receives the ink from one or more ink supply regions housing, e.g., a volume of free ink and/or a capillary media configured to store the ink in individual capillaries. In another example, the printhead 10 may be a separate unit operatively connected (via appropriate tubing or the like) to a remotely located ink supply. In other words, printheads 10 can be integrated into the ink cartridge 26 (Integrated Print Head: IPH); or a printhead 10 can be integrated into a printer which has Individual Ink Cartridges (IIC). It is to be understood that other configurations of the thermal inkjet printhead 10 are also contemplated herein.

Figure 4:
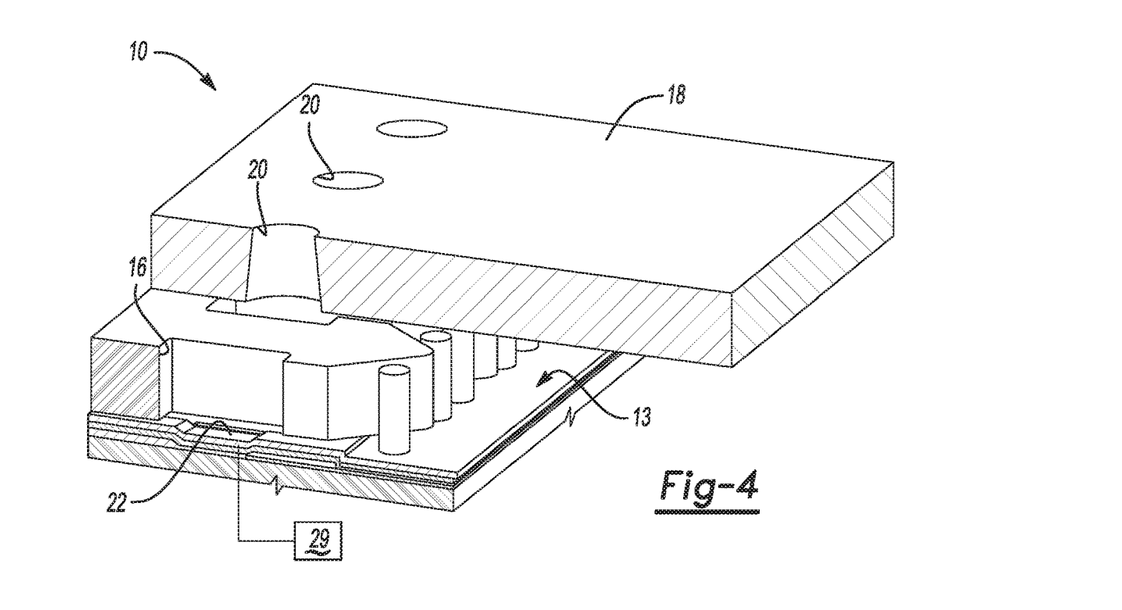
FIG. 4 is a partially cross-sectioned perspective semi-schematic illustration showing an example of a nozzle plate of an example thermal inkjet printhead.

The printhead 10 further includes a nozzle plate 18 disposed on the substrate 12. In an example, the nozzle plate 18 includes a plurality of orifices 20 (three of which are shown in FIG. 4). The orifice 20 is generally in fluid communication with the ink chamber 16 and is configured to eject an ink drop therethrough during an ink ejection process (i.e., the pushing of the ink out of the printhead 10 through the orifice 20 during thermal inkjet printing).

A heating/firing resistor 22 is operatively disposed on the base substrate 11 and proximate to the ink feed opening(s) 14 and ink chamber(s) 16. The heating/firing resistor 22 is also operatively associated with the orifice 20. Although FIG. 4 depicts that the heating/firing resistor 22 is operatively associated with a single orifice 20, it is to be understood that the resistor 22 may also be operatively associated with a plurality of orifices 20.

In an example of a thermal inkjet printhead 10, an array of ink chambers 16 receives liquid ink from the ink channel 13. The heating/firing resistor 22 is located opposite the nozzle/orifice 20 so that ink can collect between it and the orifice 20. The firing of ink droplets is typically under the control of a microprocessor (not shown), the signals of which are conveyed by electrical traces to the resistors 22. When electric printing pulses/electrical current is passed through the inkjet firing/heating resistor 22 to heat it to the desired firing temperature, a small portion of the ink next to it vaporizes and ejects a drop of ink from the printhead 10.

Figure 5:
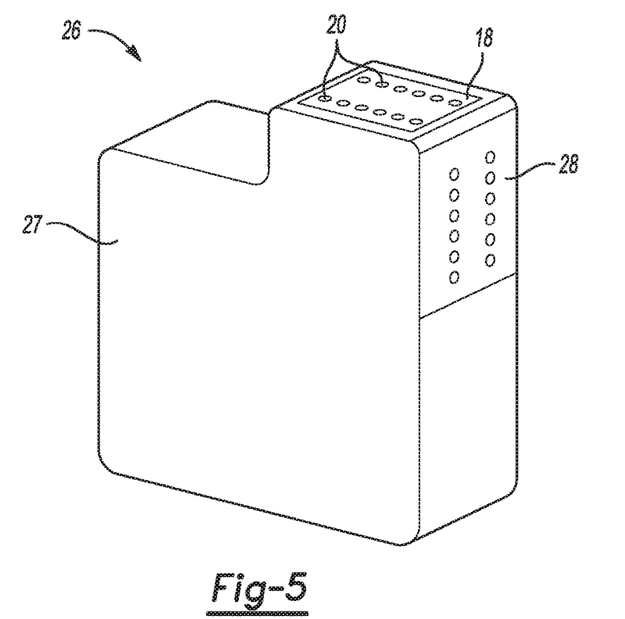
FIG. 5 is a perspective view of an example of a thermal inkjet cartridge.

FIG. 5 is a semi-schematic illustration of an inkjet print cartridge 26 incorporating a printhead 10 according to an example. The inkjet print cartridge 26 includes an internal ink reservoir (not shown) within the cartridge body 27 and a printhead. The body 27 can include the ink reservoir wholly contained within the cartridge body 27 or, alternatively, can include a chamber inside the cartridge body 27 that is fluidly coupled to one or more off-axis ink reservoirs (not shown).

The printhead includes a nozzle plate 18 including orifices 20 formed in a flexible polymer circuit. The flexible circuit provides for the routing of conductive traces which are connected at one end to electrodes on the substrate and on the other end to contact pads 28. The print cartridge 26 is designed to be installed in a printer so that the contact pads 28 on the front surface of the flexible circuit contact printer electrodes, thereby providing externally generated energization signals to the printhead. Each resistor 22 may act as an ohmic heater when selectively energized by one or more pulses applied sequentially or simultaneously to one or more of the contact pads 28.

A printhead controller 29 is operatively connected to the heating resistor 22, to activate an electrical current to pass the electrical current through the heating resistor 22 to apply an operating energy that, in some examples, includes a margin over a turn-on energy (TOE) for the printhead 10, wherein the margin ranges from about 10% to about 25% over the TOE.

It is to be understood that a single printhead 10 may include multiple (e.g., 400 or some other desirable number) heating/firing resistors 22 and orifices 20. While not shown, it is to be understood that the printhead 10 includes an integrated circuit that selectively routes signals (e.g., from the microprocessor (operatively associated with the printhead controller 29) that is capable of running suitable computer readable instructions) to the desirable resistor(s) 22 and orifice(s) 20 for firing ink drops therefrom to produce images directly on the textile substrate or on a transfer medium.

The print cartridge 26 including the heating/firing resistor 22 may be mounted in a carriage of an inkjet printer (not shown). The carriage may move the print cartridge 26 across a print substrate (e.g., the textile substrate or the transfer medium) in a print/image zone of the printer. The orifice(s) 20 associated with the resistor 22 may be arranged in one or more linear orifice arrays. The orifice(s) 20 may be aligned parallel to the direction in which the print substrate is moved through the printer and perpendicular to the direction of motion of the resistor 22 with the print cartridge 26. Control of the ejection of thermal inkjet dye sublimation ink from each orifice 20 causes characters, or other images, to be printed in a swath across the textile substrate or the transfer medium.

Alternatively, the print cartridge 26 may be a page-wide print cartridge that is in fluid communication with an off-axis ink supply system. The page-wide print cartridge includes a print head bar that extends the entire print/image zone, and thus the page-wide print cartridge is static during a printing operation.

Figure 6:
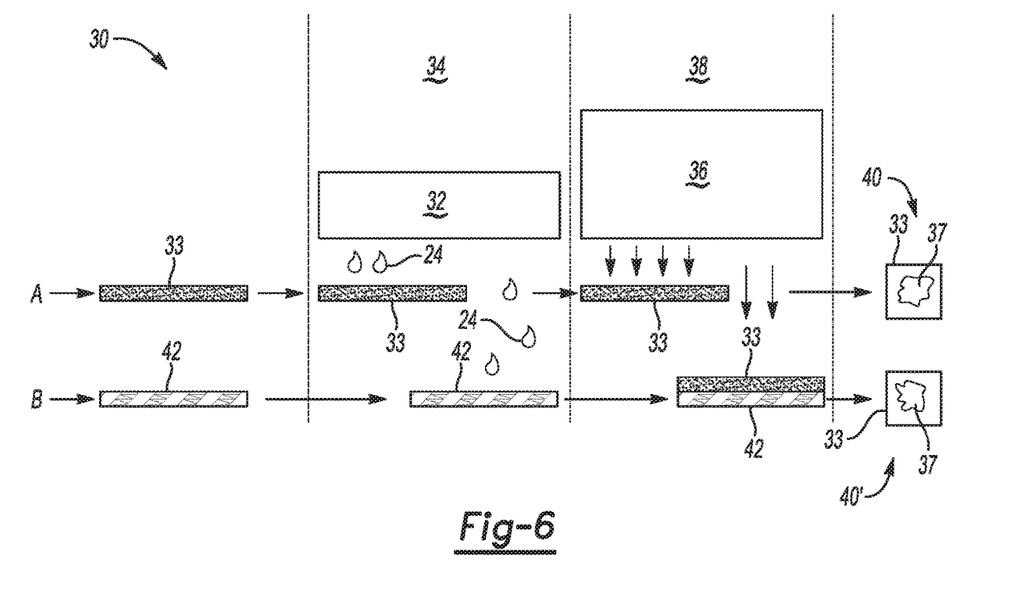
FIG. 6 is a schematic diagram of two examples of a printing system.

Referring now to FIG. 6, a schematic diagram of a printing system 30 including a thermal inkjet printer 32 in a printing zone 34 of the printing system 30 and a dryer 36 positioned in a sublimation zone 38 of the printing system 30.

In one example, a textile substrate 33 may be transported through the printing system 30 along the path shown by arrow A such that the textile substrate 33 is first fed to the printing zone 34 where an example of the thermal inkjet dye sublimation ink 24 disclosed herein is inkjet printed directly onto the textile substrate 33 by the thermal inkjet printer 32 (for example from the printhead 10 as described above) to form an ink layer on the textile substrate 33. The ink layer disposed on the textile substrate 33 may be heated in the printing zone 34 (for example, the air temperature in the printing zone 34 may range from about 10° C. to about 90° C.) such that water may be at least partially evaporated from the ink layer. As an example, at least partial evaporation means that at least 50% of the water is removed. As another example, at least 80% of the water may be removed during evaporation. Generally, it is desirable for enough water to be removed from an area so that color in the area is not transferred to an adjacent portion/facing surface of the textile substrate 33 during/after rolling that comes in contact with the area. The textile substrate 33 (having the ink layer printed thereon) may then be transported to the sublimation zone 38 where the ink layer is heated or heated and exposed to pressure to sublimate the dye, causing it to penetrate into the textile substrate 33. This forms the printed article 40 including the image 37 formed on the textile substrate 33.

In another example, a transfer medium 42 may be transported through the printing system 30 along the path shown by arrow B such that the transfer medium 42 is first fed to the printing zone 34 where an example of the thermal inkjet dye sublimation ink 24 disclosed herein is inkjet printed directly onto the transfer medium 42 by the thermal inkjet printer 32 (for example, from the printhead 10 as described above) to form an ink layer on the transfer medium 42. The transfer medium 42 (having the ink layer printed thereon) may then be transported to the sublimation zone 38 and placed into contact with the textile substrate 33. In the sublimation zone 38, the ink layer is heated, or heated and exposed to pressure, to sublimate the dye from the transfer medium 42, causing it to penetrate into the penetrable textile substrate 33. This forms the printed article 40' including the image 37 formed on the textile substrate 33. Dye sublimation transfer printing is also known as blocking and/or backside transfer printing.

To further illustrate the present disclosure, examples are given herein. It is to be understood that these examples are provided for illustrative purposes and are not to be construed as limiting the scope of the present disclosure.

EXAMPLES

Example 1

A comparative black ink and an example black ink were prepared. The comparative black ink included a chelating agent, but did not include the oleth-3-phospate. The example black ink included a chelating agent and also included the oleth-3-phospate.

A comparative magenta ink and an example magenta ink were also prepared. The comparative magenta ink included the chelating agent, but did not include the oleth-3-phospate. The example magenta ink included the chelating agent and also included the oleth-3-phospate.

All of the ink formulations are shown in Table 1. The weight percentages given for the dye dispersion and the chelating agent represent wt % actives in the ink formulations.

TABLE 1

| Ingredient | Specific Component | Comparative Black Ink Amount (wt %) | Example Black Ink Amount (wt %) | Comparative Magenta Ink Amount (wt %) | Example Magenta Ink Amount (wt %) |
| --- | --- | --- | --- | --- | --- |
| Dye Dispersion | Black dye dispersion | 5 | 5 | N/A | N/A |
| | Magenta dye dispersion | N/A | N/A | 5 | 5 |
| Primary Solvent | Glycerol | 15 | 15 | 15 | 15 |
| | Ethoxylated glycerol | 5 | 5 | 5 | 5 |
| Surfactant | SURYNOL ® 465 | 0.5 | 0.5 | 0.5 | 0.5 |
| Chelating Agent | TRILON ® M | 0.04 | 0.04 | 0.04 | 0.04 |
| Jetting Aid (surfactant) | Oleth-3-Phosphate | N/A | 0.2 | N/A | 0.2 |
| Buffer | TRIS | 0.1 | 0.1 | 0.1 | 0.1 |
| Water | | Balance | Balance | Balance | Balance |

The comparative and example inks were tested using HP 831 thermal inkjet color printheads and various test fixtures to repeatedly fire the printheads (at 15% over-energy) and to measure drop velocity (DV, in m/s) and drop weight (DW, in ng) at various life stages of the printheads, represented by millions of drops per nozzle (MDPN). Each of these values was taken at a given life stage, namely 0, 1, 2, 10, 20, and 100 MDPN. Two tests were performed for each of the comparative and example inks, where the respective inks were printed from both sides of respective printheads.

Figure 7A:
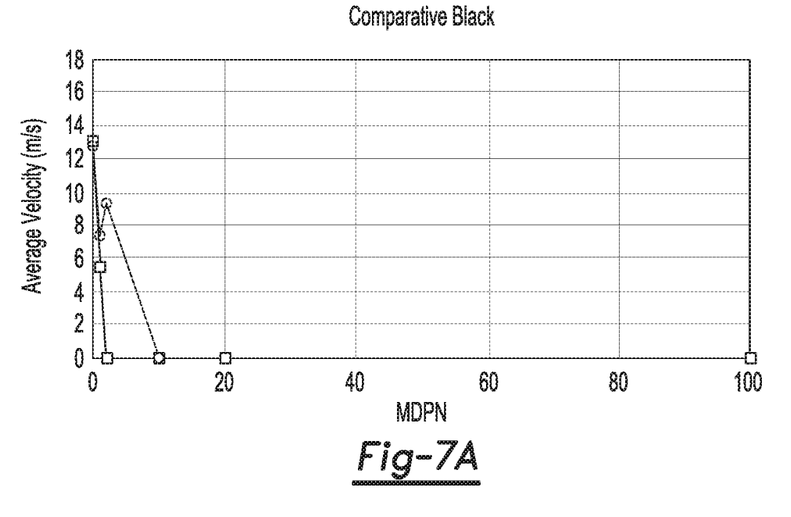
FIGS. 7A and 7B are graphs depicting the average drop velocity in meters per second (FIG. 7A) and the average drop weight in nanograms (FIG. 7B) at various printhead life stages in terms of millions of drops per nozzle (MDPN) for a comparative black ink.
Figure 7B:
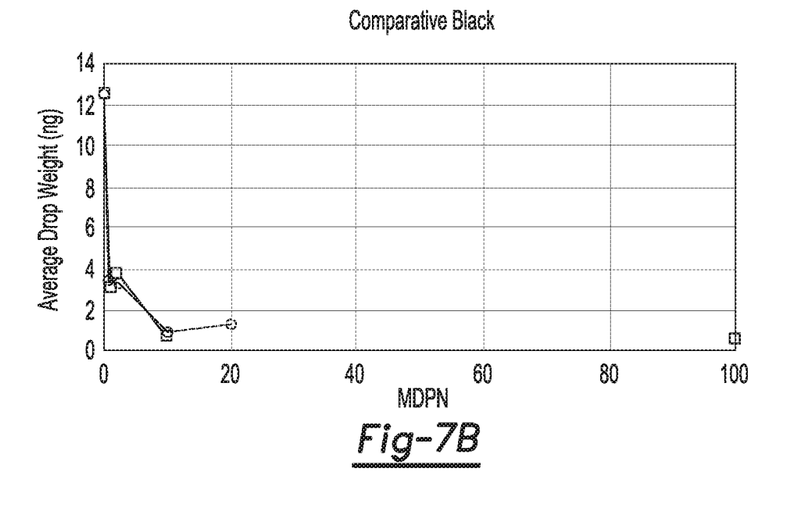
Figure 8A:
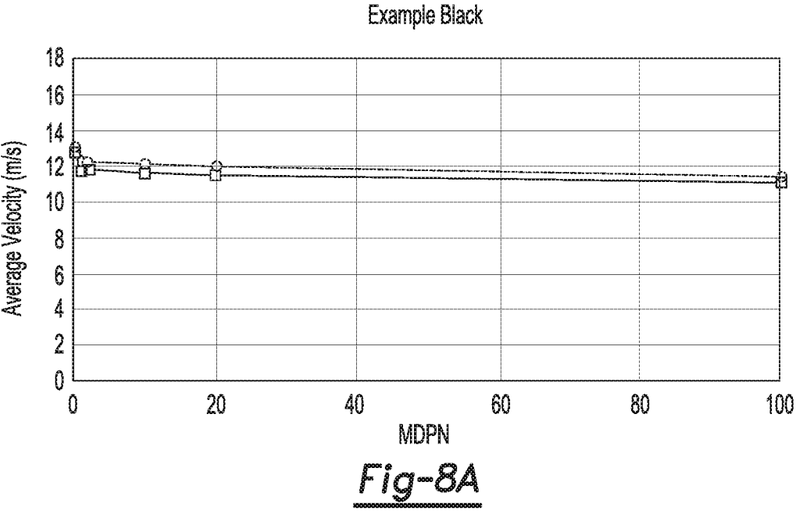
FIGS. 8A and 8B are graphs depicting the average drop velocity in meters per second (FIG. 8A) and the average drop weight in nanograms (FIG. 8B) at various printhead life stages in terms of millions of drops per nozzle (MDPN) for an example black thermal inkjet dye sublimation ink.
Figure 8B:
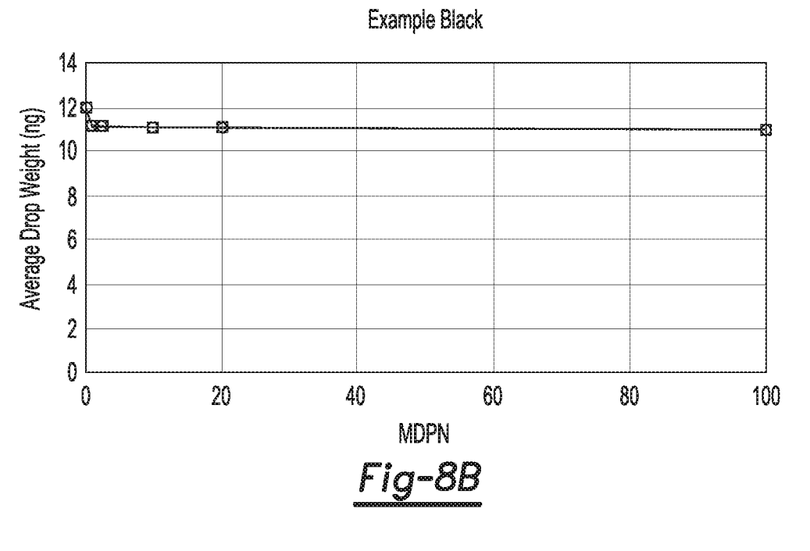

The average drop velocity and average drop weight results for the comparative black ink are shown in FIGS. 7A and 7B, respectively, and the average drop velocity and average drop weight results for the example black ink are shown in FIGS. 8A and 8B, respectively. Clearly, the combination of the TRILON® M chelating agent with the oleth-3-phosphate in the example black ink improved both the drop velocity and drop weight over a much longer period than when the TRILON® M was used without the oleth-3-phosphate (100 MDPN as opposed to 10 MDPN).

Figure 9A:
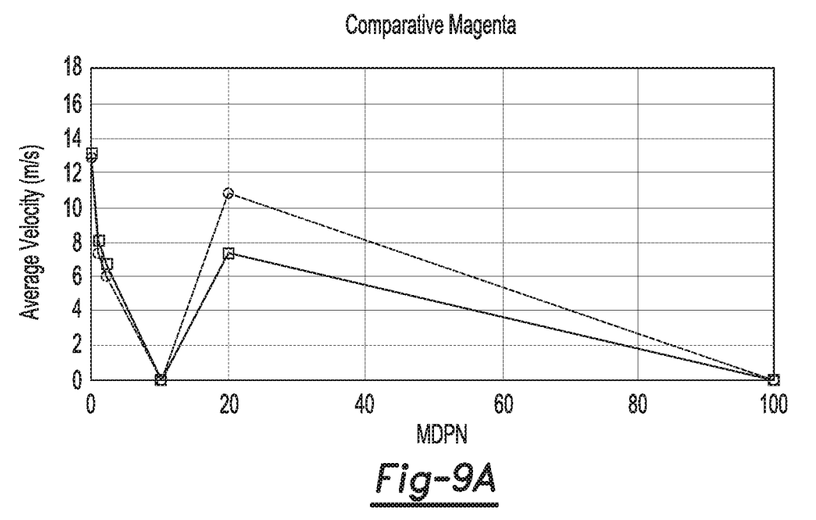
FIGS. 9A and 9B are graphs depicting the average drop velocity in meters per second (FIG. 9A) and the average drop weight in nanograms (FIG. 9B) at various printhead life stages in terms of millions of drops per nozzle (MDPN) for a comparative magenta ink.
Figure 9B:
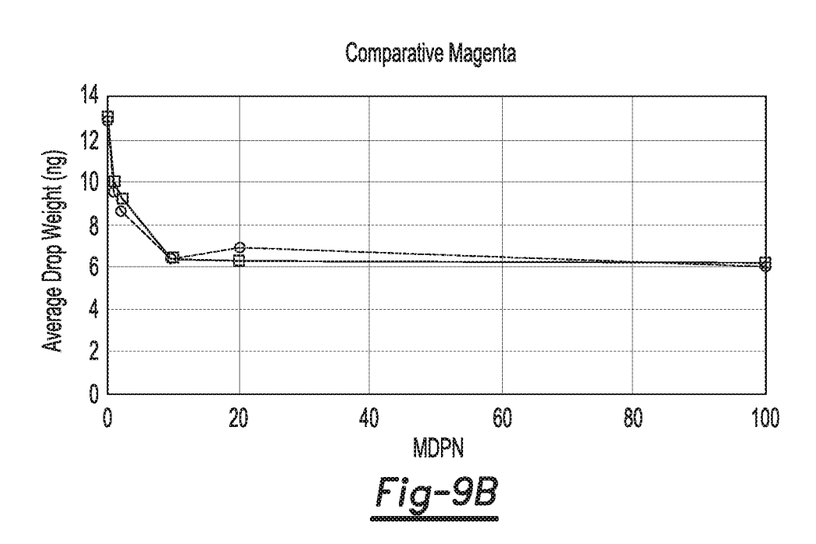
Figure 10A:
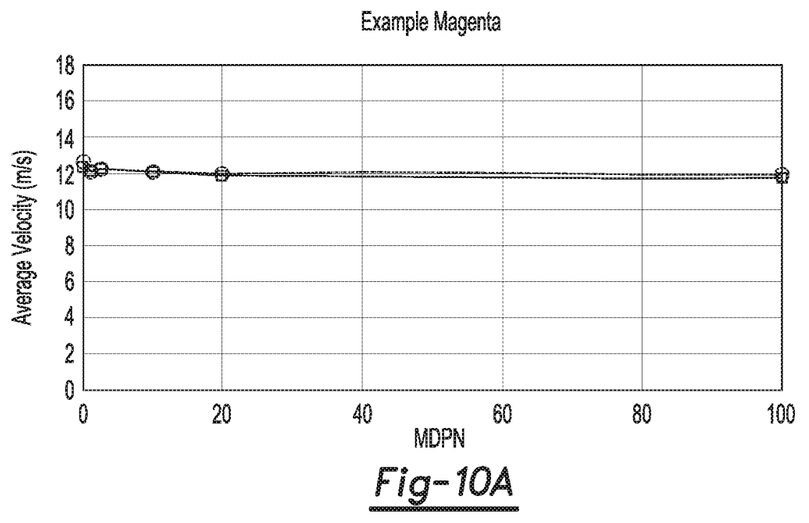
FIGS. 10A and 10B are graphs depicting the average drop velocity in meters per second (FIG. 10A) and the average drop weight in nanograms (FIG. 10B) at various printhead life stages in terms of millions of drops per nozzle (MDPN) for an example magenta thermal inkjet dye sublimation ink.
Figure 10B:
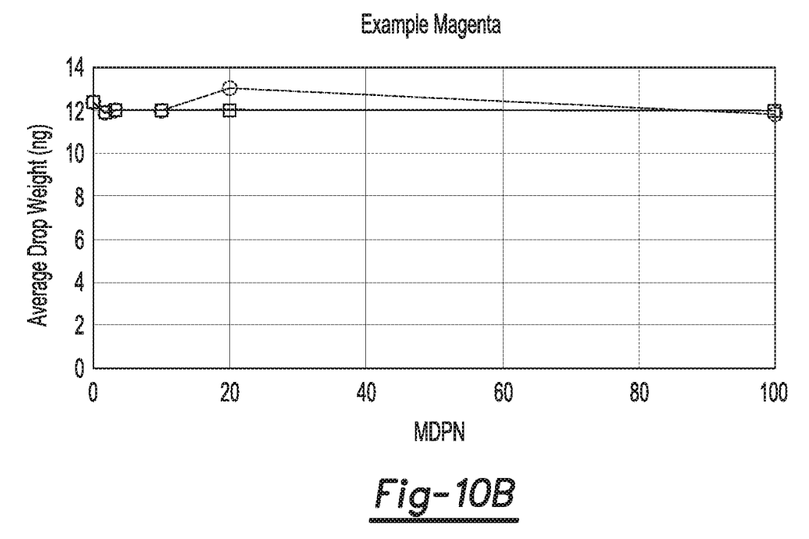

The average drop velocity and average drop weight results for the comparative magenta ink are shown in FIGS. 9A and 9B, respectively, and the average drop velocity and average drop weight results for the example magenta ink are shown in FIGS. 10A and 10B, respectively. Similar to the black ink results, the combination of the TRILON® M chelating agent with the oleth-3-phosphate in the magenta ink improved both the drop velocity and drop weight over a much longer period than when the TRILON® M was used without the oleth-3-phosphate.

It is to be understood that the ranges provided herein include the stated range and any value or sub-range within the stated range. For example, a range from about 10 wt % to about 22 wt % should be interpreted to include not only the explicitly recited limits of from about 10 wt % to about 22 wt %, but also to include individual values, such as 13 wt %, 17 wt %, 20.5 wt %, 21.8 wt %, etc., and sub-ranges, such as from about 12 wt % to about 17 wt %, from about 11 wt % to about 21 wt %, from about 14 wt % to about 16 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A thermal inkjet dye sublimation ink, consisting of:
    a disperse dye colorant dispersion present in an amount ranging from about 1 wt % actives to about 7 wt % actives based on a total weight of the ink;
    a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink;
    a secondary solvent present in an amount ranging from 0 wt % to about 7 wt % based on the total weight of the ink;
    a chelating agent present in an amount ranging from greater than 0 wt % actives to less than 0.1 wt % actives based on the total weight of the ink;
    oleth-3-phosphate present in an amount ranging from about 0.1 wt % to about 0.75 wt % based on the total weight of the ink;
    an additive selected from the group consisting of a buffer, a biocide, an other surfactant, and combinations thereof; and
    a balance of water.

2. The thermal inkjet dye sublimation ink as defined in claim 1 wherein the chelating agent is selected from the group consisting of methylglycinediacetic acid, trisodium salt; 4,5-dihydroxy-1,3-benzenedisulfonic acid disodium salt monohydrate; ethylenediaminetetraacetic acid; hexamethylenediamine tetra(methylene phosphonic acid), potassium salt; and combinations thereof.

3. The thermal inkjet dye sublimation ink as defined in claim 1 wherein the chelating agent is present in an amount ranging from about 0.04 wt % actives to about 0.08 wt % actives based on the total weight of the ink.

4. The thermal inkjet dye sublimation ink as defined in claim 1 wherein the oleth-3-phosphate is present in an amount ranging from about 0.2 wt % to about 0.5 wt % based on the total weight of the ink.

5. The thermal inkjet dye sublimation ink as defined in claim 1 wherein the primary solvent includes a combination of glycerol and ethoxylated glycerol.

6. The thermal inkjet dye sublimation ink as defined in claim 5 wherein the glycerol is present in an amount ranging from about 12 wt % to about 16 wt % based on the total weight of the ink, and wherein the ethoxylated glycerol is present in an amount ranging from greater than 0 wt % to about 5 wt % based on the total weight of the ink.

7. The thermal inkjet dye sublimation ink as defined in claim 1 wherein the disperse dye colorant dispersion has i) a mean particle size ranging from about 50 nm to about 200 nm, and ii) from about 10 wt % dye solids to about 20 wt % dye solids and from about 4 wt % to about 7 wt % dispersant solids, based on a total weight of the colorant dispersion.

8. The thermal inkjet dye sublimation ink as defined in claim 1 wherein the disperse dye colorant dispersion is selected from the group consisting of a black disperse dye colorant dispersion, a magenta disperse dye colorant dispersion, and a yellow disperse dye colorant dispersion.

9. The thermal inkjet dye sublimation ink as defined in claim 1 wherein a disperse dye in the disperse dye colorant dispersion is more soluble in the secondary solvent than in the primary solvent.

10. The thermal inkjet dye sublimation ink as defined in claim 9 wherein the secondary solvent is selected from the group consisting of 1,2-propanediol, 1,3-propanediol, propylene glycol, 2-pyrrolidone, tetrahydrofuran, diethylene glycol, and combinations thereof.

11. A printing method, comprising:
    selecting a dye sublimation ink, including:
        a disperse dye colorant dispersion present in an amount ranging from about 1 wt % actives to about 7 wt % actives based on a total weight of the ink;
        a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink;
        a secondary solvent present in an amount ranging from 0 wt % to about 7 wt % based on the total weight of the ink;
        a chelating agent present in an amount ranging from greater than 0 wt % actives to less than 0.1 wt % actives based on the total weight of the ink;
        oleth-3-phosphate present in an amount ranging from about 0.1 wt % to about 0.75 wt % based on the total weight of the ink;
        an additive selected from the group consisting of a buffer, a biocide, an other surfactant, and combinations thereof; and
        a balance of water; and
    applying to a heating resistor of a thermal inkjet printhead an operating energy that includes a margin over a turn-on energy (TOE) for the printhead, wherein the margin ranges from about 10% to about 25% over the TOE; and
    thermal inkjet printing, from the thermal inkjet printhead, the dye sublimation ink:
    i) directly onto a textile substrate; or
    ii) onto a transfer medium to form an image on the transfer medium; and
    transferring the image from the transfer medium onto the textile substrate.

12. The method as defined in claim 11 wherein a disperse dye in the disperse dye colorant dispersion is more soluble in the secondary solvent than in the primary solvent.

13. The method as defined in claim 11 wherein:
    the primary solvent includes a combination of the glycerol and the ethoxylated glycerol; and
    the chelating agent is methylglycinediacetic acid, trisodium salt.

14. A method for improving thermal inkjet printing performance of a dye sublimation ink, comprising:
    selecting oleth-3-phosphate or a combination of a chelating agent and oleth-3-phosphate; and incorporating the combination into the dye sublimation ink, including:
- a disperse dye colorant dispersion present in an amount ranging from about 1 wt % actives to about 7 wt % actives based on a total weight of the ink;
- a primary solvent selected from the group consisting of glycerol, ethoxylated glycerol, 2-methyl-1,3-propanediol, dipropylene glycol, and combinations thereof, the primary solvent being present in an amount ranging from about 10 wt % to about 22 wt % based on the total weight of the ink;
- a secondary solvent present in an amount ranging from 0 wt % to about 7 wt % based on the total weight of the ink;
- an additive selected from the group consisting of a buffer, a biocide, an other surfactant, and combinations thereof; and
- a balance of water;

wherein the incorporating involves:
- adding the chelating agent in an amount ranging from greater than 0 wt % actives to less than 0.1 wt % actives based on the total weight of the ink; and
- adding the oleth-3-phosphate in an amount ranging from about 0.1 wt % to about 0.75 wt % based on the total weight of the ink.

15. The method as defined in claim 14 wherein:

the primary solvent includes a combination of the glycerol and the ethoxylated glycerol; and the chelating agent is included and is methylglycinediacetic acid, trisodium salt.

* * * * *